(12) United States Patent
Wei et al.

(10) Patent No.: US 8,914,861 B2
(45) Date of Patent: Dec. 16, 2014

(54) AUTHENTICATION METHOD AND AUTHENTICATION SYSTEM BASED ON FORKING, AND FORKING AUTHENTICATION DEVICE

(75) Inventors: Yinxing Wei, Shenzhen (CN); Zhimeng Teng, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 602 days.

(21) Appl. No.: 13/120,207

(22) PCT Filed: Dec. 16, 2008

(86) PCT No.: PCT/CN2008/073532
§ 371 (c)(1),
(2), (4) Date: Jun. 3, 2011

(87) PCT Pub. No.: WO2009/155765
PCT Pub. Date: Dec. 30, 2009

(65) Prior Publication Data
US 2011/0225639 A1 Sep. 15, 2011

(30) Foreign Application Priority Data

Jun. 23, 2008 (CN) .......................... 2008 1 0100484

(51) Int. Cl.
*G06F 15/16* (2006.01)
*H04L 29/06* (2006.01)
(52) U.S. Cl.
CPC ............ *H04L 63/08* (2013.01); *H04L 65/1006* (2013.01); *H04L 65/1069* (2013.01)
USPC .......................................................... 726/7
(58) Field of Classification Search
None
See application file for complete search history.

(56) References Cited

U.S. PATENT DOCUMENTS 7,243,370 B2 * 7/2007 Bobde et al. .................... 726/10
7,376,232 B2   5/2008 Soliman
(Continued)

FOREIGN PATENT DOCUMENTS

CN   101127603 A   2/2008
CN   101296085 A   10/2008

OTHER PUBLICATIONS

Qi Qui, Study of Digest Authentication for Session Initiation Protocol (SIP), Dec. 2003, University of Ottawa, pp. 1-27.*

(Continued)

*Primary Examiner* — Lisa Lewis
*Assistant Examiner* — Olanrewaju Bucknor
(74) *Attorney, Agent, or Firm* — Scully, Scott, Murphy & Presser, P.C.

(57) ABSTRACT

An authentication method and an authentication system based on forking, and a forking authentication device are provided. The method includes: setting authentication credentials on the receiving devices and the original device respectively; a forking network element forking a calling request after receiving the calling request from the original device, and transmitting the forked calling request to the corresponding receiving devices; the forking network element receiving challenging values from a plurality of receiving devices, and forwarding a plurality of challenging values to the original device; the forking network element receiving the calling request which is retransmitted by the original device, wherein the retransmitted calling request carries relevant authentication credentials; and the forking network element forking the retransmitted calling request, and transmitting the forked calling request to the corresponding receiving devices, such that the receiving devices authenticate the original device according to the authentication credentials.

9 Claims, 5 Drawing Sheets

(56) References Cited

U.S. PATENT DOCUMENTS

| | | | |
|---|---|---|---|
| 7,787,441 B2* | 8/2010 | Bußer et al. | 370/352 |
| 7,802,091 B2* | 9/2010 | Halasz et al. | 713/155 |
| 8,613,058 B2* | 12/2013 | Beyer et al. | 726/5 |
| 2002/0150226 A1* | 10/2002 | Gallant et al. | 379/210.02 |
| 2005/0069135 A1* | 3/2005 | Brickell | 380/277 |
| 2005/0273595 A1* | 12/2005 | Ogawa et al. | 713/153 |
| 2007/0234038 A1* | 10/2007 | Jin | 713/155 |
| 2007/0234408 A1* | 10/2007 | Burch et al. | 726/6 |
| 2008/0002671 A1* | 1/2008 | Nagai | 370/352 |
| 2008/0046573 A1* | 2/2008 | Ropolyi et al. | 709/227 |
| 2009/0113559 A1* | 4/2009 | Schneider | 726/29 |
| 2009/0199276 A1* | 8/2009 | Schneider | 726/5 |
| 2009/0215463 A1* | 8/2009 | Satake | 455/445 |
| 2010/0190484 A1* | 7/2010 | Nishigai | 455/422.1 |

OTHER PUBLICATIONS

International Search Report dated Mar. 26, 2009 issued in corresponding International Application No. PCT/CN2008/073532.

* cited by examiner

AUTHENTICATION METHOD AND AUTHENTICATION SYSTEM BASED ON FORKING, AND FORKING AUTHENTICATION DEVICE

FIELD OF THE INVENTION

The present invention relates to communication field, and specifically, to an authentication method and an authentication system based on forking, and a forking authentication device.

BACKGROUND OF THE INVENTION

In the Session Initiation Protocol (referred to as SIP), a call can be transmitted to multiple locations, and no matter where the receiver is, the caller can always find the receiver. Such ability of the SIP makes it easy to realize multiparty call, one number service, call forwarding service and etc. in the Telecom network. SIP Forking can realize the function that the caller can always find the receiver wherever the receiver is. The SIP Forking represents that: a proxy server transmits a SIP request to multiple locations, and returns a response to the transmitter. In general, forking is classified as sequential forking and parallel forking, with the sequential forking representing that a proxy server contacts different receivers one by one, and the parallel forking representing that the proxy server simultaneously contacts different receivers. Compared with the sequential forking, the parallel forking can reduce the time for establishing a session. The SIP supports both the sequential forking and the parallel forking.

Next Generation Network (referred to as NGN) is the technology based on Internet Protocol (referred to as IP). Due to insecurity of the IP network, compared with the traditional Telecom network, the NGN is faced with security threats, wherein an authentication mechanism is used to identify the identity of a subject, which can avoid security threats such as counterfeit. In some cases, the receiver of a message may want to know the identity of the sender of the message, for example, the identities of spammers. Thus, the receiver of the message needs to authenticate the sender of the message.

However, in the Next Generation Network, with the situation of the SIP signaling forking, the authentication of some certain services (such as multiparty call, one number service, and call forwarding) in Telecom network can not be supported, nor can the sender's identity be identified. So far, no technical solutions for addressing the problems have been proposed.

SUMMARY OF THE INVENTION

The present invention is proposed in view of the problem that a receiving device cannot perform forking authentication on an original device. Thus, the present invention mainly aims to provide an authentication solution based on forking to fill the gap in current technology.

In order to achieve the above object, according to one aspect of the present invention, an authentication method based on forking is provided, the authentication method relating to authentication that at least two receiving devices perform on an original device.

The authentication method based on forking according to the present invention comprises: setting authentication credentials on the receiving devices and the original device respectively; a forking network element forking a calling request after receiving the calling request from the original device, and transmitting the forked calling request to the corresponding receiving devices; the forking network element receiving challenging values from receiving devices, and forwarding challenging values to the original device; the forking network element receiving the calling request which is retransmitted by the original device, wherein the retransmitted calling request carries relevant authentication credentials; the forking network element forking the retransmitted calling request, and transmitting the forked calling request to the corresponding receiving devices, such that the receiving devices authenticate the original device according to the authentication credentials.

Preferably, the authentication credentials comprise at least one of the following: a pre-shared key, and a digital certificate.

Preferably, the forking network element is service call session control functional equipment, and the receiving device is terminal equipment and/or next generation network element after the forking network element.

In the above, the step of forwarding challenging values to the original device particularly comprises: the forking network element collecting challenging values transmitted receiving devices into a forking request response, and transmitting the forking request response to the original device.

Besides, before the forking network element receiving the calling request which is retransmitted by the original device, the method further comprises: the original device providing different authentication credentials for different challenging values; and the original device collecting the different authentication credentials into a calling request, and retransmits the calling request.

According to another aspect of the present invention, an authentication system based on forking is provided, the authentication system comprising at least two receiving devices.

The authentication system based on forking according to the present invention comprises: a setting module, configured to set authentication credentials on the receiving devices and the original device respectively; a forking network element, configured to fork a calling request after receiving the calling request from the original device, to transmit the forked calling request to the corresponding receiving devices, and to forward to the original device a plurality of challenging values transmitted by a plurality of receiving devices; an original device, configured to transmit a calling request, to retransmit the calling request after receiving the plurality of challenging values, and to carry relevant authentication credentials in the retransmitted calling request; a receiving device, configured to perform authentication on the original device according to the authentication credentials, after receiving the retransmitted calling request.

In the above, the forking network element is further configured to receive a calling request retransmitted by the original device.

According to a further aspect of the present invention, a forking authentication device is provided, the forking authentication device being located in an original device.

The forking authentication device according to the present invention comprises: a setting module, configured to set authentication credentials; a transmission module, configured to transmit a calling request; a receiving module, configured to receive challenging values from a forking network element; and a retransmission module, configured to retransmit the calling request, and to carry in the calling request the authentication credentials corresponding to the challenging values.

According to a still further aspect of the present invention, a forking authentication device is provided, the forking authentication device being located in a receiving device.

The forking authentication device according to an embodiment of the present invention comprises: a setting module, configured to set authentication credentials; a transmission module, configured to transmit challenging values to an original device through a forking network element, after receiving a calling request from the original device; an authentication module, configured to perform authentication on the original device according to the authentication credentials carried in the retransmitted calling request after receiving a calling request retransmitted by the original device.

By means of the technical solution of the present invention, with the method of setting authentication credentials on a receiving device and an original device respectively, the problem that the receiving device currently cannot carry out forking authentication on the original device is settled, which enables authentication performed by the receiving device on the original device, based on SIP signaling forking.

Other characteristics and advantages of the present invention will be explained in the following description, and moreover, parts of them become obvious from the description, or understood by carrying out the present invention. The object and other advantages of the present invention can be realized and obtained through the structure particularly mentioned in the description, the claims, and the accompanying drawings.

BRIEF DESCRIPTION OF THE ACCOMPANYING DRAWINGS

The drawings herein are used to provide further understanding of the present invention and form a part of the specification, which are used to explain the present invention with embodiments of the present invention rather than unduly limit the present invention. In the accompanying drawings.

DETAILED DESCRIPTION OF THE EMBODIMENTS

Brief Description on Functions

In view of the problem that the receiving device currently can not carry out forking authentication on the original device, the embodiments of the present invention provide an authentication solution based on forking. In the solution, authentication credentials are set on a receiving device and an original device respectively, a forking network element forks a calling request from the original device, and transmits the forked calling request to the corresponding receiving device, the forking network element receives challenging values from a plurality of receiving devices, and forwards a plurality of challenging values to the original device, the forking network element receives the calling request which is retransmitted by the original device, wherein the retransmitted calling request carries relevant authentication credentials, the forking network element forks the retransmitted calling request, and transmits the forked calling request to the corresponding receiving device, such that the receiving devices authenticate the original device according to the authentication credentials.

It should be explained that the embodiments in the present application and the features in the embodiments can be combined with each other if there is no conflict. The preferable embodiments are described in conjunction with the drawings herein as follows. It shall be understood that the preferable embodiments herein are just used to describe and explain the present invention and shall not be construed as limiting the present invention.

In the present invention, unless otherwise specified, the forking network element can be service call session control function equipment, and the receiving device can be the terminal equipment and/or the next generation network element located at the downstream of the forking network element.

Method Embodiments

Figure 1:
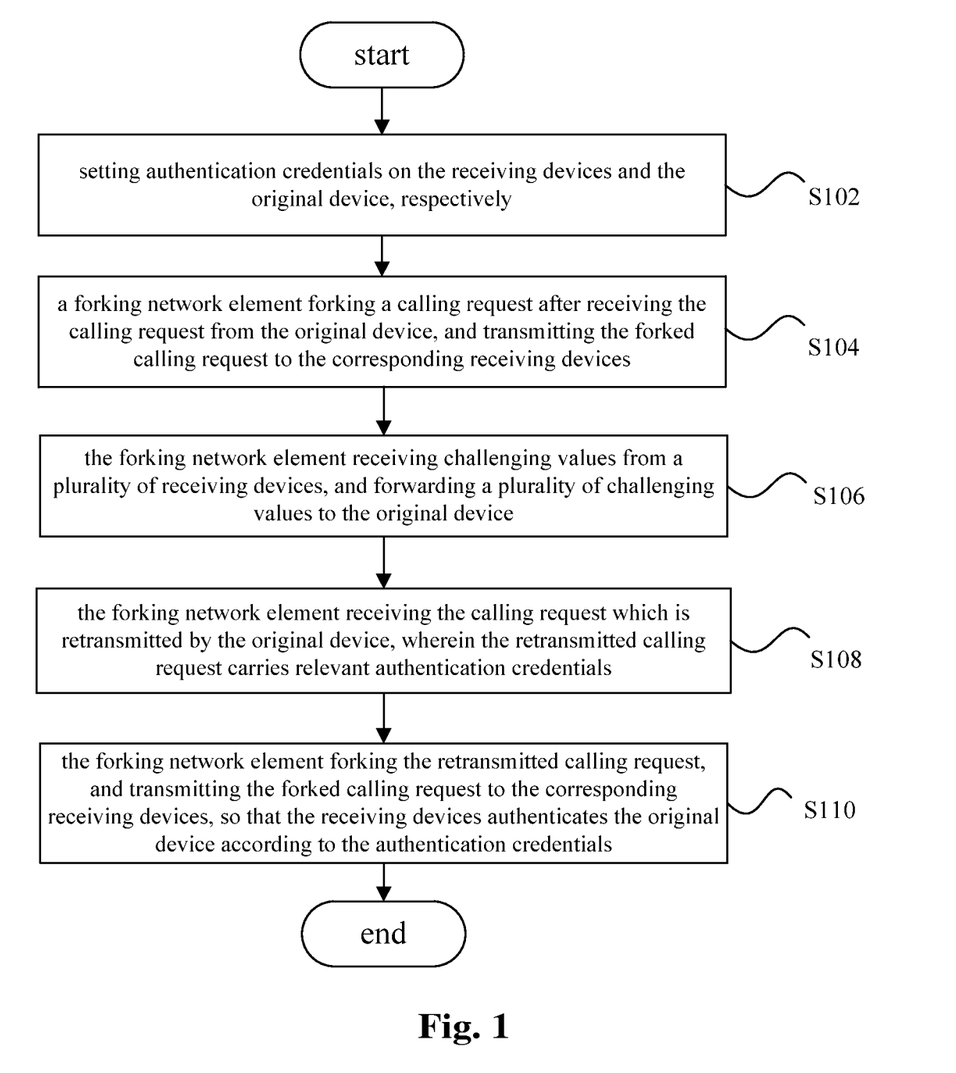
FIG. 1 is a flow chart of the authentication method based on forking according to an embodiment of the present invention.

In the present embodiment, an authentication method based on forking is provided, which relates to the authentication that at least two receiving devices perform on an original device. FIG. 1 is a flow chart of the authentication method based on forking according to an embodiment of the present invention. As shown in FIG. 1, the following Step S102 to Step S110 are included.

Step S102, authentication credentials are set on the receiving devices and the original device respectively, wherein the authentication credentials used in the embodiments of the present invention include, but are not limited to, pre-shared keys and digital certificates; and by means of the authentication credentials, the subsequent authentication process can be realized.

Step S104, a forking network element forks a calling request after receiving the calling request from the original device, wherein as mentioned above, the forking here may be either sequential forking or parallel forking; and transmits the forked calling request to the corresponding receiving devices.

Step S106, the forking network element receives challenging values from a plurality of receiving devices, and forwards a plurality of challenging values to the original device, particularly, the forking network element can collect a plurality of challenging values transmitted by the plurality of receiving devices in a forking request response, and transmit the forking request response to the original device; and at the original device side, after receiving the forking request response, the original device provides different authentication credentials for different challenging values, and collects the different authentication credentials in the forking request, and then, retransmits the forking request after the collecting operation.

Step S108, the forking network element receives the calling request which is retransmitted by the original device, wherein the retransmitted calling request carries relevant authentication credentials.

Step S110, the forking network element forks the retransmitted calling request, and transmits the forked calling request to the corresponding receiving devices, such that the receiving devices authenticates the original device according to the authentication credentials, for example, the receiving devices can perform a decryption operation on the received authentication credentials by using a locally set digital certificate, wherein if the decryption succeeds, the authentication is passed, otherwise, the authentication fails.

Through the present embodiment, an authentication method based on forking is provided, which enables a receiving device to complete the authentication on an original device.

Apparatus Embodiment 1

Figure 2:
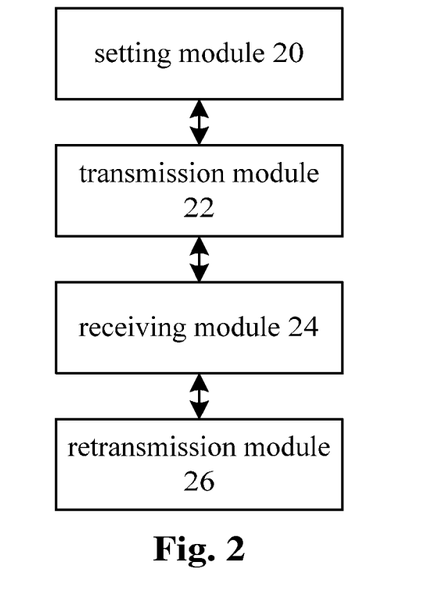
FIG. 2 is a block diagram of the forking authentication device according to Apparatus Embodiment 1 of the present invention.

In the present embodiment, a forking authentication device is provided, which is located in an original device. FIG. 2 is a block diagram of the forking authentication device according to Apparatus Embodiment 1 of the present invention. As shown in FIG. 2, the device comprises: a setting module 20, a transmission module 22, a receiving module 24, and a retransmission module 26. The structure is now described as follows.

The setting module 20 is configured to set authentication credentials; the transmission module 22 is configured to transmit a calling request; the receiving module 24 is configured to receive challenging values from a forking network element; and the retransmission module 26 is configured to retransmit the calling request, and to carry in the calling request the authentication credentials corresponding to the challenging values. The retransmission module can be integrated with the setting module and the transmission module, so as to realize initial transmission and retransmission functions.

It should be explained that a network element (such as the original device mentioned above) comprising the forking authentication device is also covered by the scope of protection of the present invention.

Apparatus Embodiment 2

Figure 3:
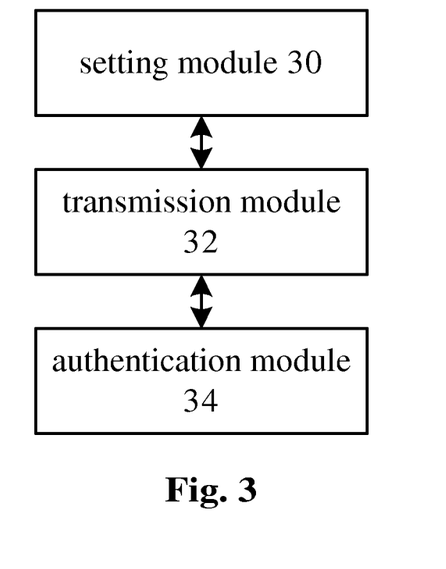
FIG. 3 is a block diagram of the forking authentication device according to Apparatus Embodiment 2 of the present invention.

In the present embodiment, a forking authentication device is provided, which is located in a receiving device. FIG. 3 is a block diagram of the forking authentication device according to Apparatus Embodiment 2 of the present invention. As shown in FIG. 3, the device comprises: a setting module 30, a transmission module 32, and an authentication module 34. The structure is now described as follows.

The setting module 30 is configured to set authentication credentials; the transmission module 32 is configured to transmit challenging values to an original device through a forking network element, after receiving a calling request from the original device; and the authentication module 34 is configured to perform authentication on the original device according to the authentication credentials carried in the retransmitted calling request after receiving a calling request retransmitted by the original device.

It should be explained that terminal equipment and/or next generation network element (such as the receiving device mentioned above), which is after the forking network element and comprises the forking authentication device, is also covered by the scope of protection of the present invention.

System Embodiment

Figure 4:
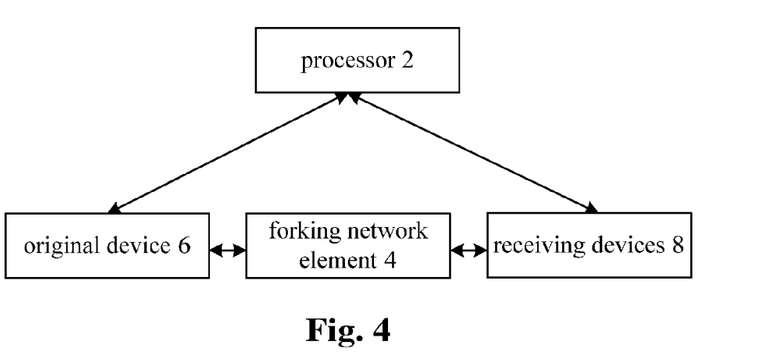
FIG. 4 is a signaling flow chart of specific processing according to Example 1 of the embodiment of the present invention.

In the present embodiment, an authentication system based on forking is provided. The authentication system comprises at least two receiving devices. FIG. 4 is a block chart of the authentication system based on forking according to an embodiment of the present invention. As shown in FIG. 4, the system comprises: a processor 2, a forking network element 4, an original device 6, and a receiving devices 8. The structure is now described as follows.

The processor 2 is configured to set authentication credentials on the receiving devices and the original device respectively, wherein the processor can be set separately and can be located either at the forking networking element side or in the original device or receiving devices, and even if the processor is in other suitable devices or network elements, the present invention can also be carried out.

It should be explained that, during the process of setting authentication credentials, the processor 2 also can store the authentication credentials set through a storage medium. The "storage medium" here can indicate one or more devices for storing data, including read-only memory (ROM), random access memory (RAM), magnetic RAM, magnetic core memory, disk storage medium, optical storage medium, flash memory device and/or other machine readable media for storing information. The term "machine readable media" includes, but is not limited to, portable or fixed storage devices, optical storage devices, radio channels or various other media capable of storing, containing, or carrying instructions and/or data.

The forking network element 4 is configured to realize forking function and interaction of information or data between the original device and the receiving devices. For example, for the direction from the original device to the receiving devices, the forking network element 4 forks a calling request after receiving the calling request from the original device, and transmits the forked calling request to the corresponding receiving devices; and for the direction from the receiving devices to the original device, the forking network element 4 receives a plurality of challenging values from a plurality of receiving devices, and forwards the plurality of challenging values to the original device, such that the interaction between the original device and a target device is realized.

The original device 6 is mainly configured to transmit a calling request (transmission module 60), and to retransmit the calling request (calling transmission module 60), after receiving the challenging values from the receiving devices (receiving module 62), and carry in the retransmitted calling request the relevant authentication credentials which are used for the receiving devices to perform the subsequent authentication on the original device.

The receiving devices 8 is mainly configured to receive the calling request from the original device (receiving module 80), and to transmits the challenging values based on the calling request (transmission module 82), or to receive the calling request which is retransmitted by the original device in response to the challenging values thereof (receiving module 80), and authenticates the original device according to the authentication credentials (authentication module 84).

With the present embodiment, an authentication system based on forking is provided, which enables a receiving device to perform the authentication on an original device.

EXAMPLE 1

The method embodiment and system embodiment of the above technology are to be described in detail in conjunction with the accompanying drawings.

Figure 5:
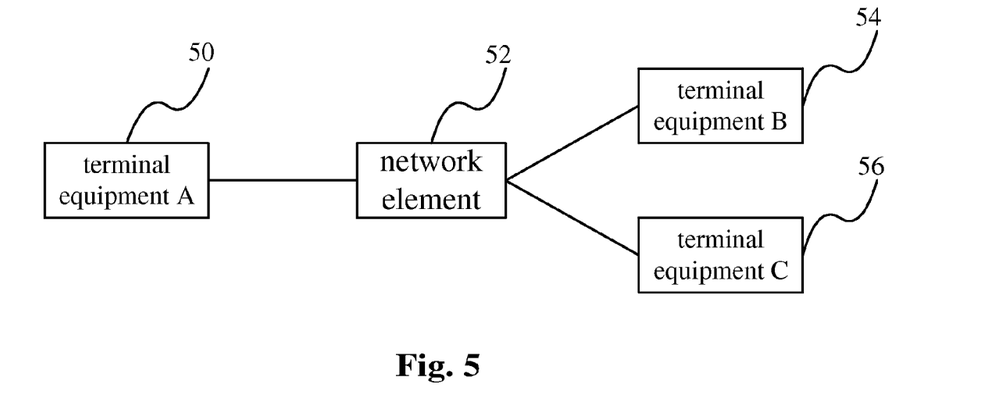
FIG. 5 is a signaling flow chart of specific processing according to Example 2 of the embodiment of the present invention.

FIG. 5 shows a schematic diagram of forking of a request. As shown in FIG. 5, Terminal Equipment (TE) A 50 is the original device initiating a request; TE B 54 and TE C 56, the receiving devices, register contact addresses with a NE; and Network Element 50 (NE) forks a request from the TE A 50, and transmits it to the TE B 54 and the TE C 56. Moreover, the information received by the NE 30 can be transmitted by a terminal device, or by other network elements. After receiving the request, the TE B 54 and the TE C 56 authenticate the TE A 50.

Figure 6:
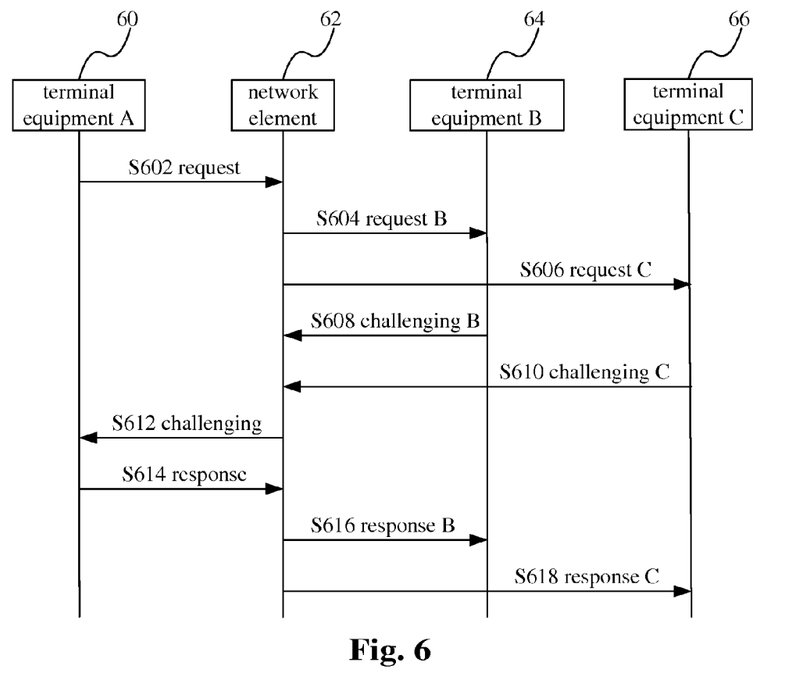
FIG. 6 is a block chart of the authentication system based on forking according to an embodiment of the present invention.

The processing procedure shown in FIG. 6 is described with reference to the authentication system based on forking. As shown in FIG. 6, firstly, two devices, the TE B 64 and the TE C 66, of the same user identity register contact addresses with the NE 62, and then, the TE A 60 initiates a call, which is particularly embodied as:

Step S602, the TE A 60 initiates, through the NE 62, a request of communicating with a user;

Step S604, the NE 62 transmits to the receiving device TE B 64 one fork obtained by forking the request, according to the contact address registered by the user.

Step S606, the NE 62 transmits to the receiving device TE C 66 another fork obtained by forking the request according to the contact address registered by the user.

Step S608, the TE B 64 transmits a response containing challenging values to the TE A 60;

Step S610, the TE C 66 transmits a response containing challenging values to the TE A 60.

Step S612, the NE 62 combines the responses in Step S608 and Step S610 into one response, and returns it to the TE A 60.

Step S614, the TE A 60 respectively constructs a response according to the security algorithm supported and the challenging values in the response received;

Step S616, the NE 62 forks the response, transmits one fork to the TE B 64, and performs authentication on the TE A 60 at the TE B 64.

Step S618, the NE 62 forks the response, transmits another fork to the TE C 66, and performs authentication on the TE A 60 at the TE C 66.

Preferably, after the authentication of the TE B 64 and the TE C 66 succeed, a message indicating whether the authentication succeeds or not is returned to the NE 62, such that the TE A 60 establishes a session with a device (the TE B 64 and/or the TE C 66) passing the authentication.

EXAMPLE 2

Figure 7:
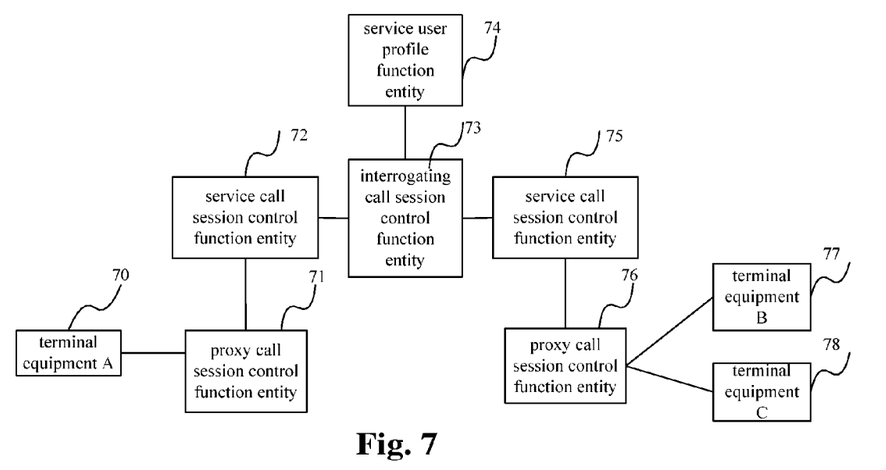
FIG. 7 is a system schematic diagram of the forking request according to an embodiment of the present invention.

FIG. 7 shows a schematic diagram of forking based on SIP request in NGN. In FIG. 7, proxy call session control function entities (Proxy CSC-FE, referred to as P-CSC-FE) 71 and 76 are responsible for maintaining security association and completion and confidentiality protection of SIP signaling. Service call session control function entities (Service CSC-FE, referred to as S-CSC-FE) 72 and 75 are responsible for processing registration process, performing routing judgment, maintaining session state and storing service configuration. When multiple contact addresses are registered for a certain user identity at S-CSC-FE 75, for example, TE B 77 and TE C 78 registration addresses, S-CSC-FE 75 forks a SIP request from TE A 70. Interrogating call session control function entity (Interrogating CSC-FE, referred to as I-CSE-FE) 73 can obtain the name of S-CSC-FE at next hop from a service user profile function entity SUP-FE 74.

Figure 8:
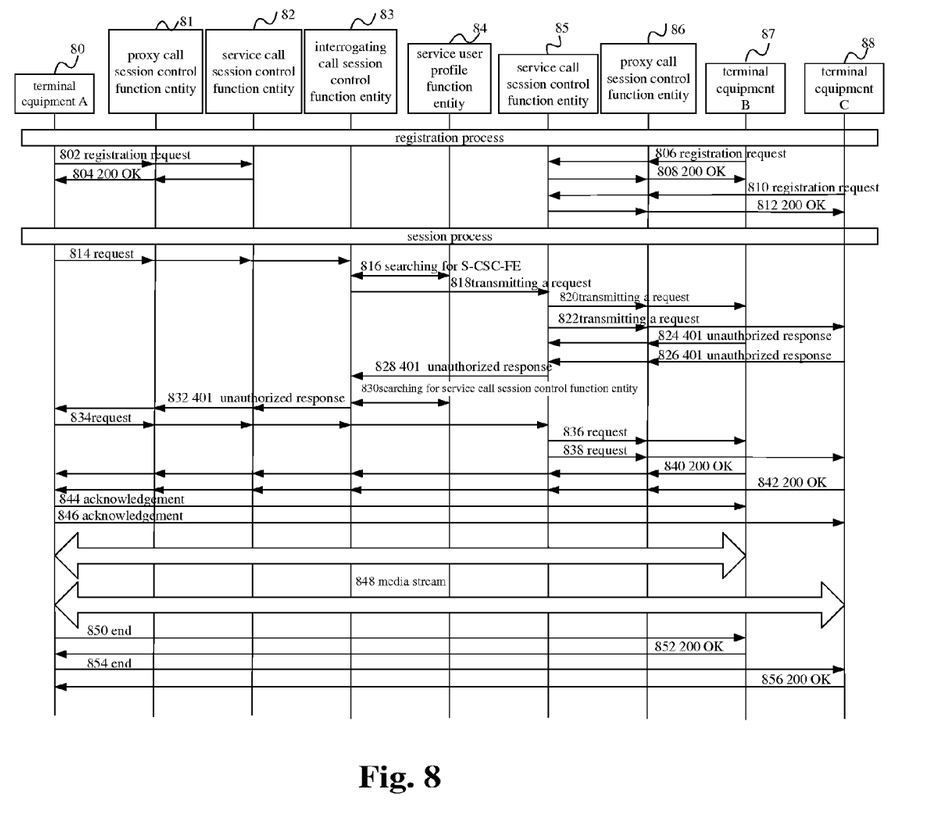
FIG. 8 is a system schematic diagram of forking based on SIP request according to an embodiment of the present invention.

FIG. 8 shows the flow of the registration, session establishment and authentication when forking based on SIP request in NGN. The processing in FIG. 8 is described in conjunction with the system shown in FIG. 7. As shown in FIG. 8, a user 1 owns the TE A 80, and a user 2 owns the TE B 87 and TE C 88.

Step S802, the contact address of the user 1 is registered, and TE A 80 transmits a registration request to S-CSC-FE 82 through P-CSC-FE 81.

Step S804, the S-CSC-FE 82 returns a registration success response to the TE A 80.

Steps S806 S812, the two contact addresses TE-B87 and TE-C88 of the user 2 are simultaneously registered in S-CSC-FE 85 through P-CSC-FE 86;

Step S814, the user 1 initiates an INVITE request to the user 2 through the TE A 80, the request passes P-CSC-FE 81 and S-CSC-FE 82, and then, reaches I-CSC-FE 83;

Step S816, I-CSC-FE 83 queries SUP-FE 84, and obtains the address of S-CSC-FE 82 corresponding to the user 2.

Step S818, I-CSC-FE 83 transmits the INVITE request to S-CSC-FE 86 of the next hop, and the user 2 registers in S-CSC-FE 85.

Step S820, after forking, the INVITE request at one fork is transmitted to the TE B 87 through P-CSC-FE 86.

Step S822, after forking, the INVITE request at another fork is transmitted to the TE B 88 through P-CSC-FE 86.

Step S824-Step S826, the TE B 87 and TE C 88 respectively initiate an unauthorized (401 UNAUTHORIZED) response to authenticate an initiation end of the INVITE, wherein the response contains the security algorithm supported and challenging values, and is transmitted to S-CSC-FE 85 through P-CSC-FE 86.

Step S828, S-CSC-FE 85 collects two unauthorized responses into one response, and transmits it to I-CSC-FE 83.

Step S830, I-CSC-FE 83 queries SUP-FE 74, and obtains the address of S-CSC-FE 82 corresponding to the user 1.

Step S832, S-CSC-FE 82 transmits the 401 UNAUTHORIZED response to the TE A 80;

Step S834, after receiving the 401 UNAUTHORIZED response, the TE A 80 respectively calculates, according to the security algorithm and challenging values provided in the TE B 87 and TE C 88, the response values by using the credentials of TE A 80, and reinitiates an INVITE request containing authorization header information;

Step S836-Step S838, after the INVITE request is transmitted to S-CSC-FE 85, it is forwarded to the TE B 87 and TE C 88 respectively, and authentication on the TE A 80 is performed at a terminal device.

Up to this point, the authentication process when forking based on SIP request in NGN is completed. Step S840-Step S856 shown in FIG. 8 are similar to the normal establishment process of SIP session, therefore are not described further at this point, wherein, the messages involved in Step S844 and Step S846 are acknowledgement (ACK) messages, and the messages involved in Step S850 and Step S854 are ending (BYE) messages. Moreover, for the purpose of simplification, the authentication process in the registration process and 180 Ringing step in the session establishment process are omitted.

Through the above processing procedure, that a receiving device performs the authentication on an upstream device when forking based on SIP request is realized.

Owing to the above mentioned, the technical solution of the present invention can realize that a receiving device performs the authentication on an original device, in cases where forking is based on SIP signaling.

Obviously, those skilled in the art shall appreciate, all of the above modules or steps of the present invention can be realized by a universal computing device, they can be concentrated in a single computing device, or distributed in the network consisting of several computing devices, preferably, they can be realized by program codes executable by the computing device, such that they can be stored in a storage device to be executed by the computing device, or each of them can be manufactured into an integrated circuit module, or several modules or steps of them can be manufactured into a single integrated circuit module. In this way, the present invention is not limited to the combination of any particular hardware and software.

The descriptions above are only preferable embodiments of the present invention, which are not used to restrict the present invention. For those skilled in the art, the present invention may have various changes and variations. Any modifications, equivalent substitutions, improvements etc. within the spirit and principle of the present invention shall be included in the scope of protection of the present invention.

What is claimed is:

1. An authentication method based on forking, relating to authentication that at least two receiving devices perform on an original device, comprising:
   setting authentication credentials on the receiving devices and the original device respectively;
   a forking network element forking a calling request after receiving the calling request from the original device, and transmitting the forked calling request to the corresponding receiving devices;
   the forking network element receiving challenging values from the receiving devices, and forwarding the challenging values to the original device;
   the forking network element receiving a calling request which is retransmitted by the original device, wherein the retransmitted calling request carries relevant authentication credentials corresponding to the challenging values; and
   the forking network element forking the retransmitted calling request, and transmitting the forked calling request to the corresponding receiving devices, such that the receiving devices authenticate the original device according to the authentication credentials.

2. The method according to claim 1, wherein the authentication credentials comprise at least one of the following: a pre-shared key, and a digital certificate.

3. The method according to claim 1, wherein the forking network element is service call session control functional equipment, and the receiving device is terminal equipment and/or next generation network element after the forking network element.

4. The method according to claim 1, wherein the step of forwarding challenging values to the original device comprises:
   the forking network element collecting challenging values transmitted by the receiving devices into a forking request response, and transmitting the forking request response to the original device.

5. The method according to claim 1, wherein before the forking network element receiving the calling request which is retransmitted by the original device, the method further comprises:
   the original device providing different authentication credentials for different challenging values; and
   the original device collecting the different authentication credentials into a calling request, and retransmitting the calling request.

6. An authentication system based on forking, comprising at least two receiving devices for authenticating an original device, comprising:
   a setting module, configured to set authentication credentials on the receiving devices and the original device respectively;
   a forking network element, connected to the original device and the receiving devices, and configured to fork a calling request after receiving the calling request from the original device, to transmit the forked calling request to the corresponding receiving devices, and to forward to the original device a plurality of challenging values transmitted by a plurality of the receiving devices;
   the original device, connected to the setting module, and configured to transmit a calling request, to retransmit the calling request after receiving the plurality of challenging values, and to carry relevant authentication credentials in the retransmitted calling request; and
   the receiving devices, connected to the setting module, and configured to perform authentication on the original device according to the authentication credentials, after receiving the retransmitted calling request.

7. The system according to claim 6, wherein the forking network element is further configured to receive a calling request retransmitted by the original device.

8. A forking authentication device located in an original device, comprising:
   a setting module, connected to a transmission module, and configured to set authentication credentials;
   the transmission module, connected to the setting module, and configured to transmit a calling request;
   a receiving module, connected to the transmission module, and configured to receive challenging values from a forking network element; and
   a retransmission module, connected to the receiving module, and configured to retransmit the calling request, and to carry in the calling request the authentication credentials corresponding to the challenging values.

9. A forking authentication device located in a receiving device, comprising:
   a setting module, connected to a transmission module, configured to set authentication credentials;
   the transmission module, connected to the setting module, configured to transmit challenging values to an original device through a forking network element, after receiving a calling request from the original device; and
   an authentication module, connected to the transmission module, configured to perform authentication on the original device according to the authentication credentials carried in the retransmitted calling request after receiving a calling request retransmitted by the original device.

* * * * *